United States Patent
Army et al.

(10) Patent No.: US 12,115,479 B2
(45) Date of Patent: Oct. 15, 2024

(54) HIGH-PRESSURE ANNULAR WATER COLLECTOR WITH AXIAL SWIRL VANES FOR AN AIR CYCLE ENVIRONMENTAL CONTROL SYSTEM

(71) Applicant: Hamilton Sundstrand Corporation, Charlotte, NC (US)

(72) Inventors: Donald E. Army, Enfield, CT (US); Abbas A. Alahyari, Glastonbury, CT (US); Anthony DeLugan, Westfield, MA (US); Ephraim Joseph, Newnan, GA (US); Michael Maynard, Somers, CT (US); Seth E. Rosen, Cromwell, CT (US); John H. Whiton, South Windsor, CT (US); Sebastian Zuraw, Opole (PL); David Saltzman, Glastonbury, CT (US); Christopher Testa, Hartford, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 18/500,515

(22) Filed: Nov. 2, 2023

(65) Prior Publication Data
US 2024/0058732 A1   Feb. 22, 2024

Related U.S. Application Data

(62) Division of application No. 17/386,709, filed on Jul. 28, 2021, now Pat. No. 11,839,846.
(Continued)

(51) Int. Cl.
*B01D 45/16* (2006.01)
*B01D 45/06* (2006.01)
*B64D 13/06* (2006.01)

(52) U.S. Cl.
CPC ............ *B01D 45/16* (2013.01); *B01D 45/06* (2013.01); *B64D 13/06* (2013.01); *B64D 2013/0674* (2013.01)

(58) Field of Classification Search
CPC ........ B01D 45/16; B01D 45/06; B01D 45/12; B01D 46/0039; B64D 13/06; B64D 2013/0674
See application file for complete search history.

(56) References Cited

U.S. PATENT DOCUMENTS 3,362,155 A * 1/1968 Driscoll ................... F02C 7/05
                                                        55/306
3,501,900 A    3/1970 Warner et al.
(Continued)

FOREIGN PATENT DOCUMENTS

WO    2020046603 A1    3/2020

OTHER PUBLICATIONS

Search Report for European Application No. 21182914.8; Application Filing Date Jun. 30, 2021; Date of Mailing Dec. 10, 2021 (7 pages).

*Primary Examiner* — Dung H Bui
(74) *Attorney, Agent, or Firm* — CANTOR COLBURN LLP

(57) ABSTRACT

An annular water removal system (AWRS) for an air cycle environmental control system (ECS) includes a line replaceable unit (LRU) configured to output air flow, and a water collector coupled to the LRU. The water collector includes an upper portion and a lower portion. The upper portion includes a coalescing unit having a collector inlet to receive the air flow and configured to coalesce moisture from the air flow output from the LRU. The lower portion includes a collection unit in fluid communication with the coalescing
(Continued)

unit. The collection unit is configured to collect the moisture coalesced by the coalescing unit.

4 Claims, 7 Drawing Sheets

Related U.S. Application Data

(60) Provisional application No. 63/058,127, filed on Jul. 29, 2020.

(56) References Cited

U.S. PATENT DOCUMENTS

| | | |
|---|---|---|
| 4,681,610 A | 7/1987 | Warner |
| 4,769,050 A | 9/1988 | Shaw et al. |
| 7,691,185 B2 | 4/2010 | Darke et al. |
| 7,931,720 B2 | 4/2011 | Stucki |
| 8,425,641 B2 | 4/2013 | Chaudhari et al. |
| 10,265,651 B2 | 4/2019 | Zager et al. |
| 10,322,621 B2 * | 6/2019 | Army ............... B01D 45/06 |
| 10,385,809 B2 | 8/2019 | Prociw |
| 10,633,099 B2 | 4/2020 | Walsh et al. |
| 11,090,592 B2 | 8/2021 | Army et al. |
| 11,154,804 B2 * | 10/2021 | Palmer ............. B01D 53/265 |
| 11,578,902 B2 | 2/2023 | Army et al. |
| 2002/0144599 A1 | 10/2002 | Afeiche et al. |
| 2006/0021356 A1 * | 2/2006 | Milde ............... B04C 3/06 62/93 |
| 2009/0324391 A1 | 12/2009 | Maier |
| 2011/0126572 A1 | 6/2011 | Peacos, III et al. |
| 2015/0292743 A1 | 10/2015 | Mook et al. |
| 2016/0175750 A1 | 6/2016 | Padovan |
| 2018/0229586 A1 | 8/2018 | Army |
| 2018/0354626 A1 | 12/2018 | Himmelmann |
| 2018/0361290 A1 | 12/2018 | Suzuki et al. |
| 2019/0009203 A1 | 1/2019 | Himmelmann |
| 2019/0054406 A1 | 2/2019 | Johnson et al. |
| 2019/0056113 A1 | 2/2019 | Mook et al. |
| 2019/0388818 A1 | 12/2019 | Martin et al. |
| 2020/0147535 A1 | 5/2020 | Hoerr et al. |
| 2020/0179851 A1 | 6/2020 | Palmer |
| 2020/0277919 A1 | 9/2020 | Suzuki et al. |
| 2020/0384398 A1 | 12/2020 | Scheckel et al. |
| 2021/0291095 A1 | 9/2021 | Peterson et al. |
| 2022/0032219 A1 * | 2/2022 | Army ............... B01D 45/16 |

* cited by examiner

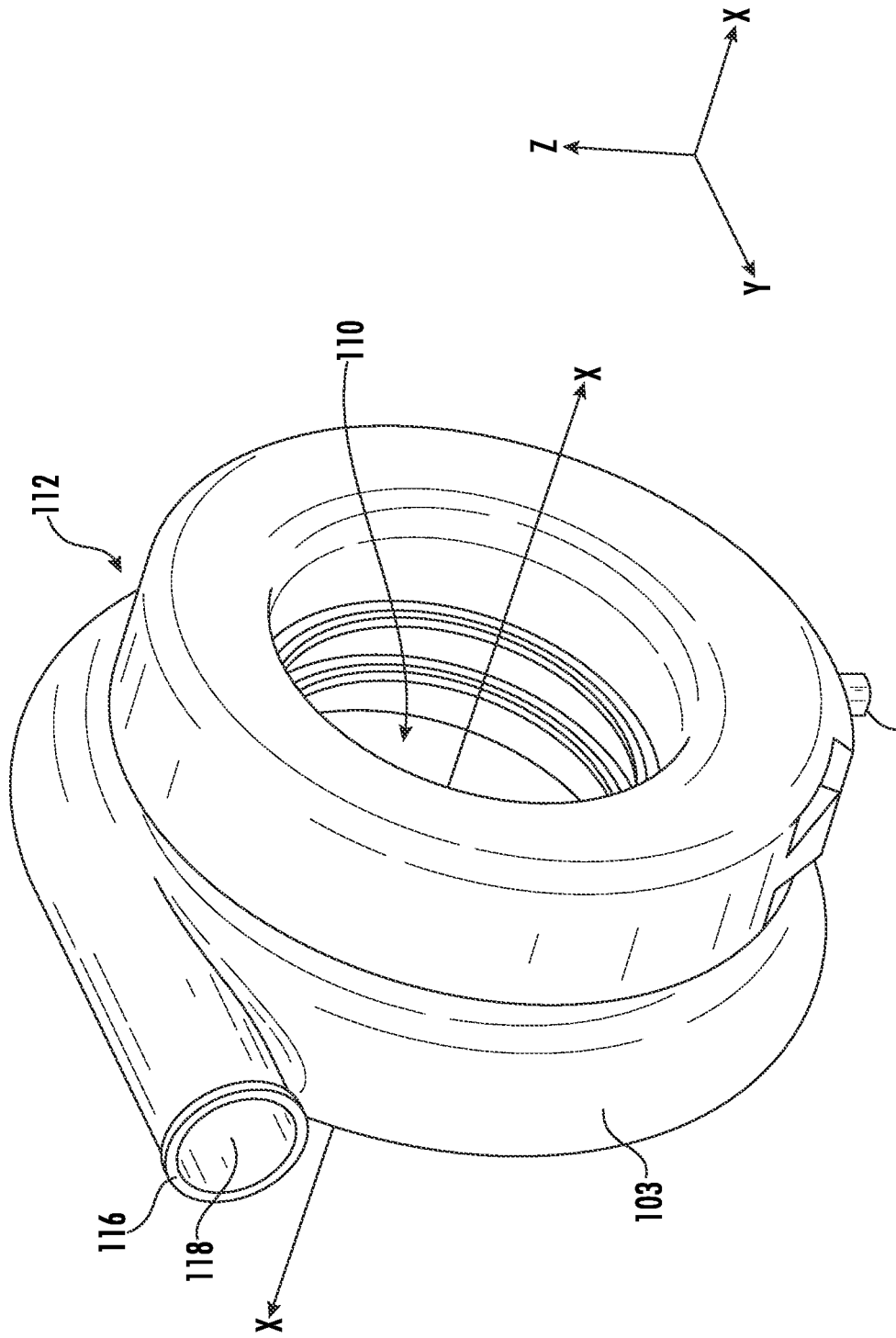

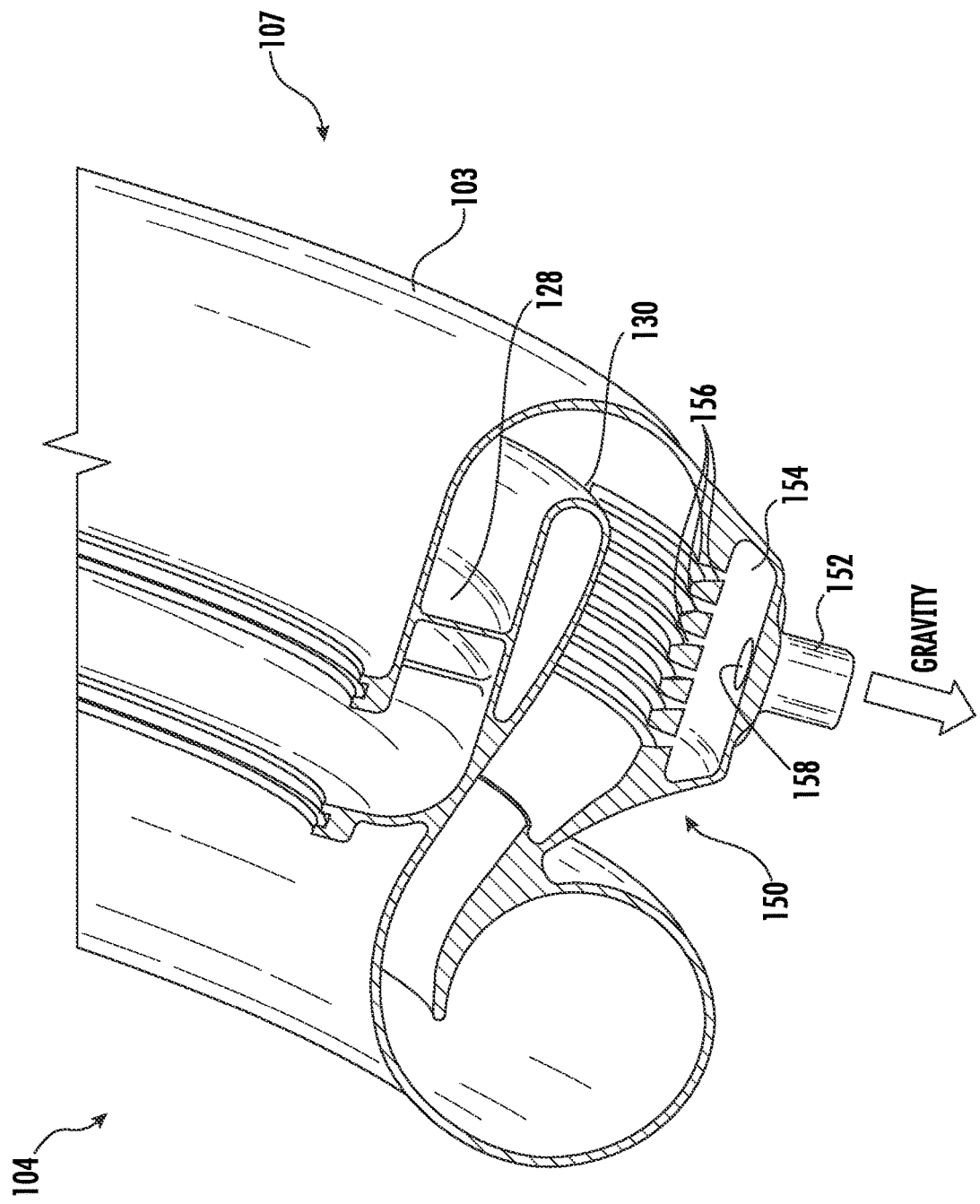

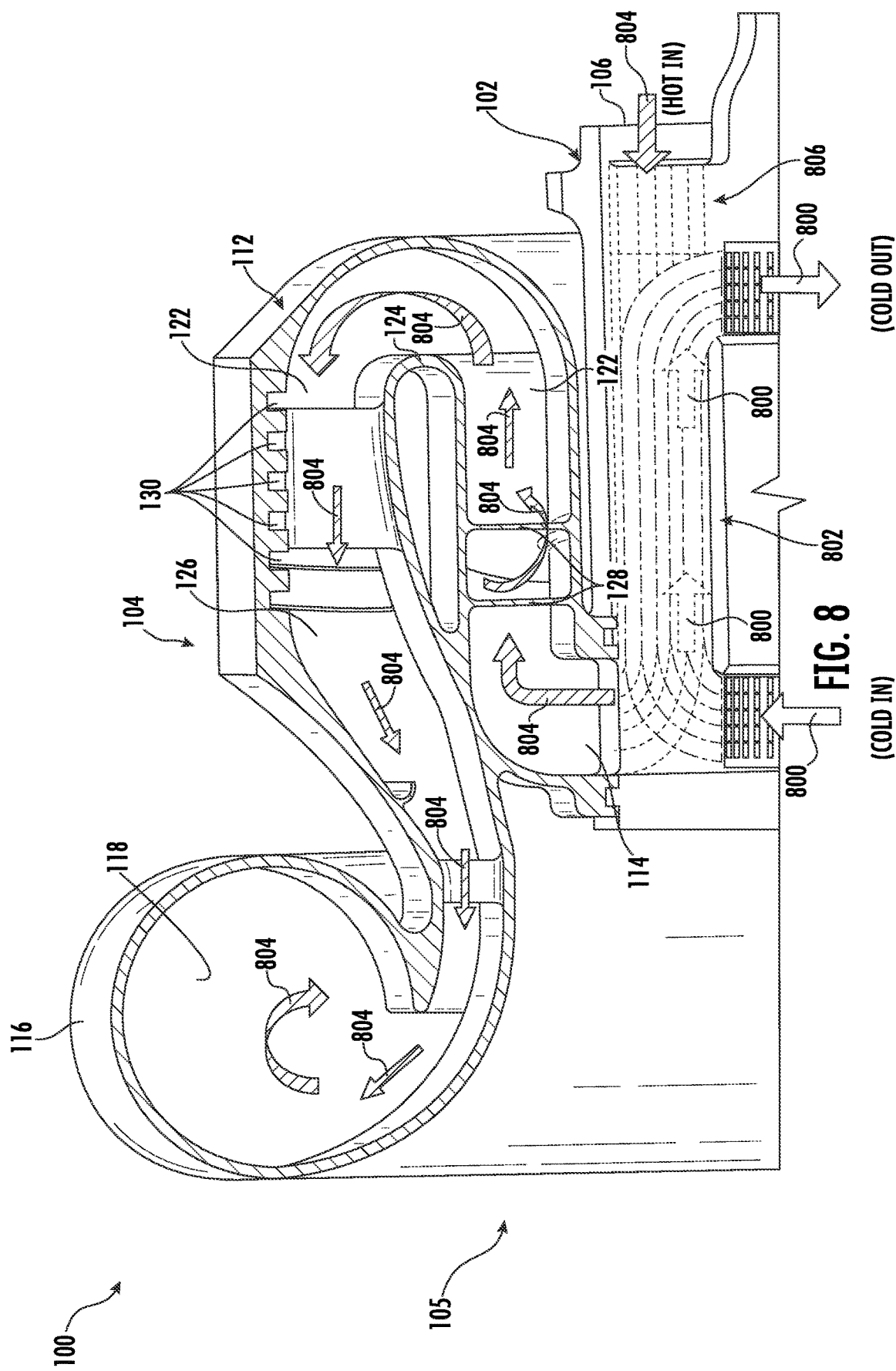

HIGH-PRESSURE ANNULAR WATER COLLECTOR WITH AXIAL SWIRL VANES FOR AN AIR CYCLE ENVIRONMENTAL CONTROL SYSTEM

CROSS-REFERENCE TO RELATED APPLICATIONS

This application is a division of U.S. application Ser. No. 17/386,709 filed on Jul. 28, 2021, which claims priority to U.S. Provisional Application No. 63/058,127 filed Jul. 29, 2020, the disclosures of which are incorporated herein by reference in their entirety.

BACKGROUND

Exemplary embodiments pertain to an aircraft environmental control system, and more particular, to an air cycle environmental control system.

Air cycle machines (ACMs) are used as part of an aircraft environment control system (ECS) for processing a pressurized air source, such as bleed air from a gas turbine engine of an aircraft. For example, ACMs used in conjunction with heat exchangers, water collectors and control valves are used to process engine bleed air to achieve a desired pressure, temperature, and humidity, which enable the ECS to provide conditioned air to the aircraft cabin and cockpit.

ACMs operate by compressing bleed air in a compressor section (i.e., a compressor), which is discharged to a downstream heat exchanger and further routed to a turbine system. The turbine system extracts energy from the expanded air to drive the compressor. The air output from the turbine system is utilized as an air supply for a vehicle, such as the cabin of an aircraft. The bleed air input to the compressor typically includes ambient moisture (e.g., water). Therefore, an ECS commonly includes a water collector that collects and removes condensed water from the processed air.

BRIEF DESCRIPTION

According to a non-limiting embodiment, an annular water removal system (AWRS) for an air cycle environmental control system (ECS) comprises a line replaceable unit (LRU) configured to output air flow, and a water collector coupled to the LRU. The water collector comprises an upper portion and a lower portion. The upper portion includes a coalescing unit having a collector inlet to receive the air flow and configured to coalesce moisture from the air flow output from the LRU. The lower portion includes a collection unit in fluid communication with the coalescing unit. The collection unit is configured to collect the moisture coalesced by the coalescing unit According to a non-limiting embodiment, a water collector is provided that is configured to remove moisture from air flow output from a line replaceable unit (LRU). The water collector comprises an upper portion and a lower portion. The upper portion includes a coalescing unit having a collector inlet to receive the air flow. The coalescing unit is configured to coalesce moisture from the air flow output from the LRU. The lower portion includes a collection unit in fluid communication with the coalescing unit. The collection unit is configured to collect the moisture coalesced by the coalescing unit.

According to still another non-limiting embodiment, a method is provided to remove moisture from an air cycle environmental control system (ECS). The method comprises outputting air flow from a line replaceable unit (LRU) to a collector inlet of a water collector and conveying the air flow from the collector inlet to a coalescing unit included in an upper portion of the water collector. The method further comprises delivering the air flow through the coalescing unit to a collector outlet and coalescing moisture from the air flow as it flows through the coalescing unit. The method further comprises delivering the coalesced moisture to a collection unit included in a lower portion of the water collector so as to collect the coalesced moisture.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

The following descriptions should not be considered limiting in any way. With reference to the accompanying drawings, like elements are numbered alike:

FIG. 3 is a perspective view of the annular water collector shown in FIG. 1 excluding the LRU according to a non-limiting embodiment;

FIG. 7 is a cross-sectional view of a lower portion of the annular water collector shown in FIG. 5 according to a non-limiting embodiment; and FIG. 8 illustrates operation of an annular high-pressure water collector according to a non-limiting embodiment.

DETAILED DESCRIPTION

Figure 1:
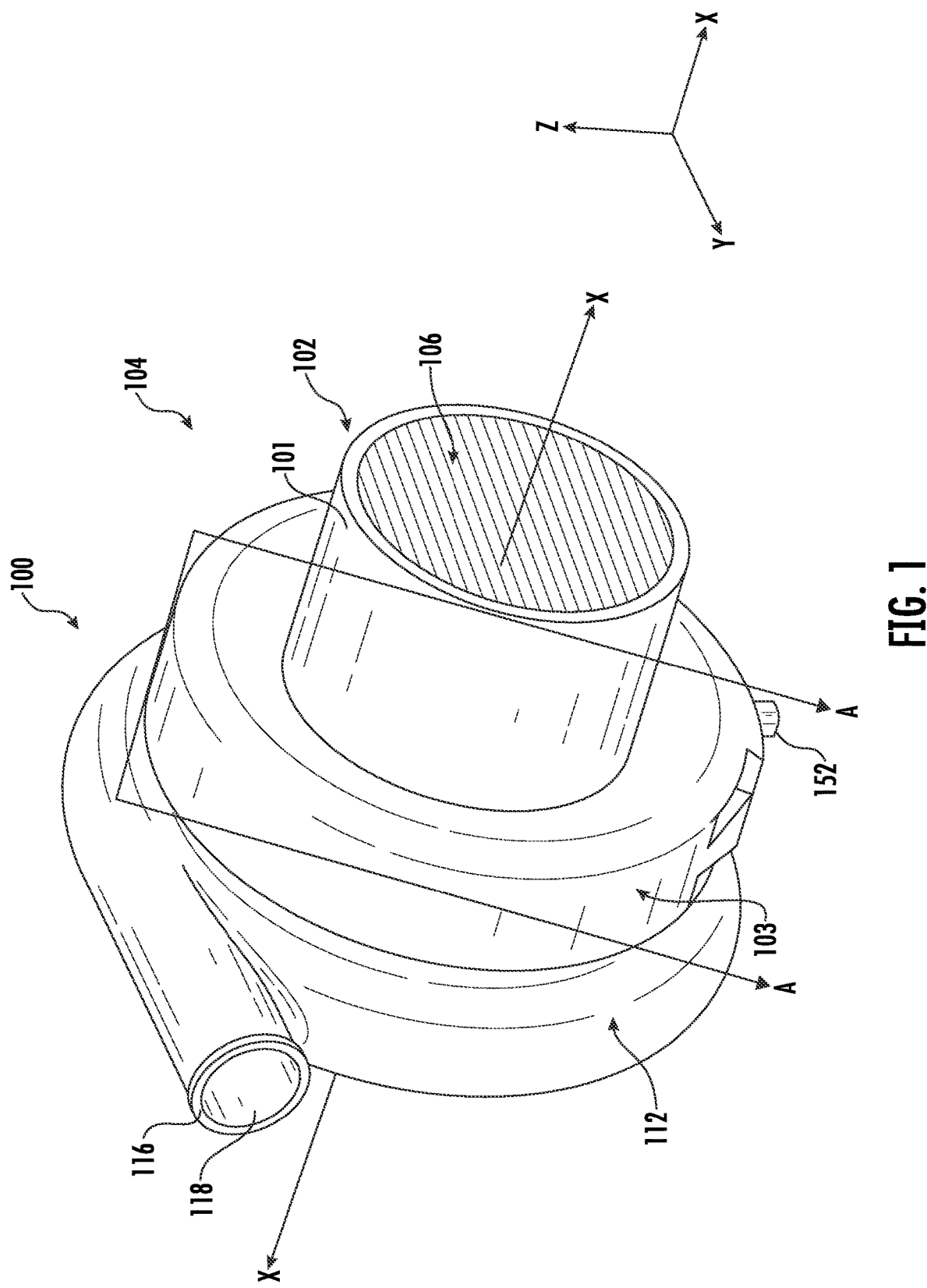
FIG. 1 is a perspective view of an annular water removal system (AWRS) including an annular water collector and line replaceable unit (LRU) according to a non-limiting embodiment.

A detailed description of one or more embodiments of the disclosed apparatus and method are presented herein by way of exemplification and not limitation with reference to the Figures.

As mentioned above, an aircraft ECS commonly includes a high pressure water collector (HPWC) that removes and collects the water from processed ambient air. Conventional high pressure water collectors typically include a primary flow passage extending along an elongated horizontal length to facilitate a centrifugation process for separating moisture from the air. The separated moisture is delivered to a secondary flow passage and into a settling chamber where pooled water is then directed to other parts of the system for evaporative cooling or discharged overboard. Conventional water collectors require three to four duct diameters upstream of the large settling chamber to centrifuge the water droplets into a settling chamber and a method to induce about 20 percent (~20%) of the total flow into and out of the settling chamber. An ejector is typically located at the outlet of the collector to draw moisture laden secondary flow though the settling chamber.

Various non-limiting embodiments described herein provides an ECS that includes a high-pressure water collector configured to interact or operate in conjunction with an LRU such as, for example, a condenser. In at least one non-limiting embodiment, the water collector has an annular profile and is configured to wrap around an annular condenser. The annular water collector includes a plurality of axial swirl vanes in fluid communication with corresponding drain grooves. Airflow including moisture (e.g., water particles) impinges the axial swirl vanes such that the water is coalesced and centrifugally delivered to one or more water grooves. The liquid water adheres to the grooves and flows circumferentially due to the gravity down the side of the collector so as to deliver the liquid water to a plurality of holes located at the lower portion of each groove. The holes convey water into a collector sump, due to a pressure gradient and gravity, where the water is collected and subsequently ejected (e.g., sprayed) into an ECS heat exchanger for additional system evaporative cooling and/or can be discharged overboard. The annular profile of the collector described herein eliminates the need for multiple upstream duct diameters (length), separate pneumatic interface couplings, a separate settling chamber and ejector associated with a conventional high pressure water collector. Accordingly, the annular profile of the water collector allows for reducing the overall packaging and size of the collector and overall ECS.

With reference now to FIGS. 1-5, an annular water removal system (AWRS) 100 capable of operating in an air cycle environmental control system (ECS) is illustrated in various views according to a non-limiting embodiment. The AWRS 100 includes a line replaceable unit (LRU) 102 and a high-pressure water collector 104. Although the LRU 102 and the water collector 104 are described herein has having an annular or cylindrical profiles, the specific dimensions are not limited thereto.

In a non-limiting embodiment, the LRU 102 includes an outer casing 101 extending radially about a center axis (X-X). The LRU 102 can include various devices such as, for example, a condenser, a heat exchanger (HX), or a rotating machine. As mentioned above, the profile of the LRU 102 includes, but is not limited to, an annular profile or a cylindrical profile. The LRU 102 includes at least one exterior air inlet 106 and at least one air outlet 108 (see FIG. 2). System air enters the at least one air inlet 106 in a first direction (e.g., along the X-axis) that is parallel with the center axis (X-X). Accordingly, the LRU 102 is configured to process system air to generate high-pressure cooled air that is expelled from the at least one air outlet 108.

The water collector 104 is coupled to the LRU 102 and is configured to coalesce, collect and remove free moisture (e.g., water) from the compressed air generated by the LRU. In one or more embodiments, the water collector 104 is additively manufactured. Various known additive manufacturing (AM) techniques can be performed to form the water collector 104 using various known AM materials. The AM materials include metallic materials such as, for example, aluminum, copper, etc., and/or non-metallic materials such as polymers.

Figure 2:
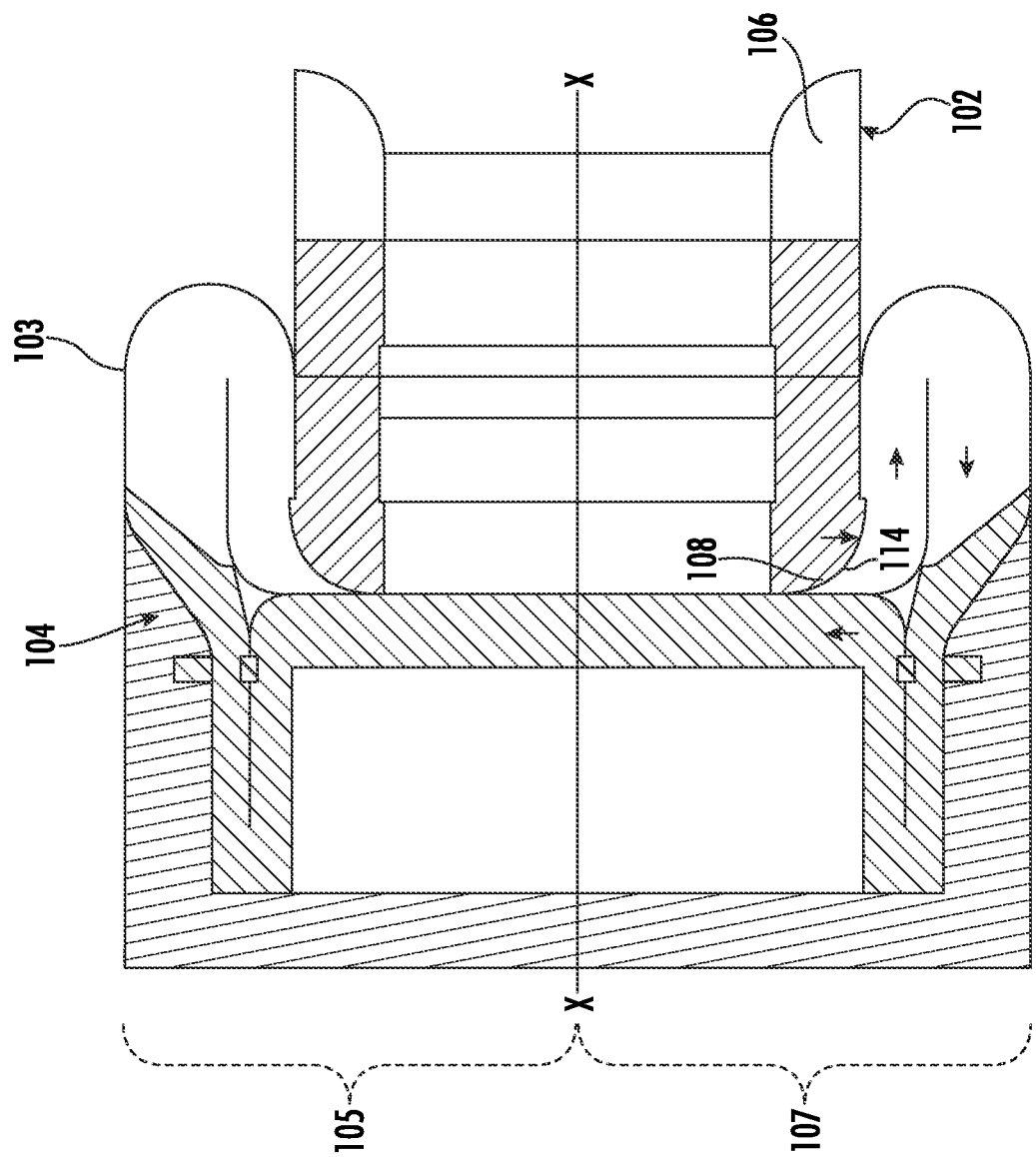
FIG. 2 is a cross-sectional view of the AWRS shown FIG. 1 taken along line A-A according to a non-limiting embodiment of the invention.

The water collector 104 can have a housing 103 extending radially about the center axis (X-X) to define an annular profile with an opening 110 that defines a diameter that is larger than the LRU diameter (See FIG. 3). Accordingly, the LRU 102 can be disposed in the opening 110 such that the water collector 104 wraps entirely around at least a portion of the LRU 102 as shown in FIGS. 1 and 2. In some non-limiting embodiments, the LRU 102 is integrally fitted in the opening 110 via additive manufacturing (see FIGS. 1 and 2) such that the water collector 104 and LRU form a monolithic structure. In other non-limiting embodiments, the LRU 102 is a separable component that is fitted in the opening 110. In cases where the LRU 102 is a separable component, an O-ring groove 135 (sometimes referred to as a toric joint) is provided to fluidly seal the interface between the LRU 102 and the water collector 104. In either case, the assembly and annular configurations of the LRU 102 and water collector 104 enable distributed flow to be ported directly into or out of mating component plenums with minimal need for additional collector plenums, external ducts, or couplings between annular heat exchanger 12 and other components of environmental control system 10. Therefore, system assembly weight and volume can be reduced. Furthermore, pressure losses (i.e., pressure drop) between mated components can be reduced.

Figure 5:
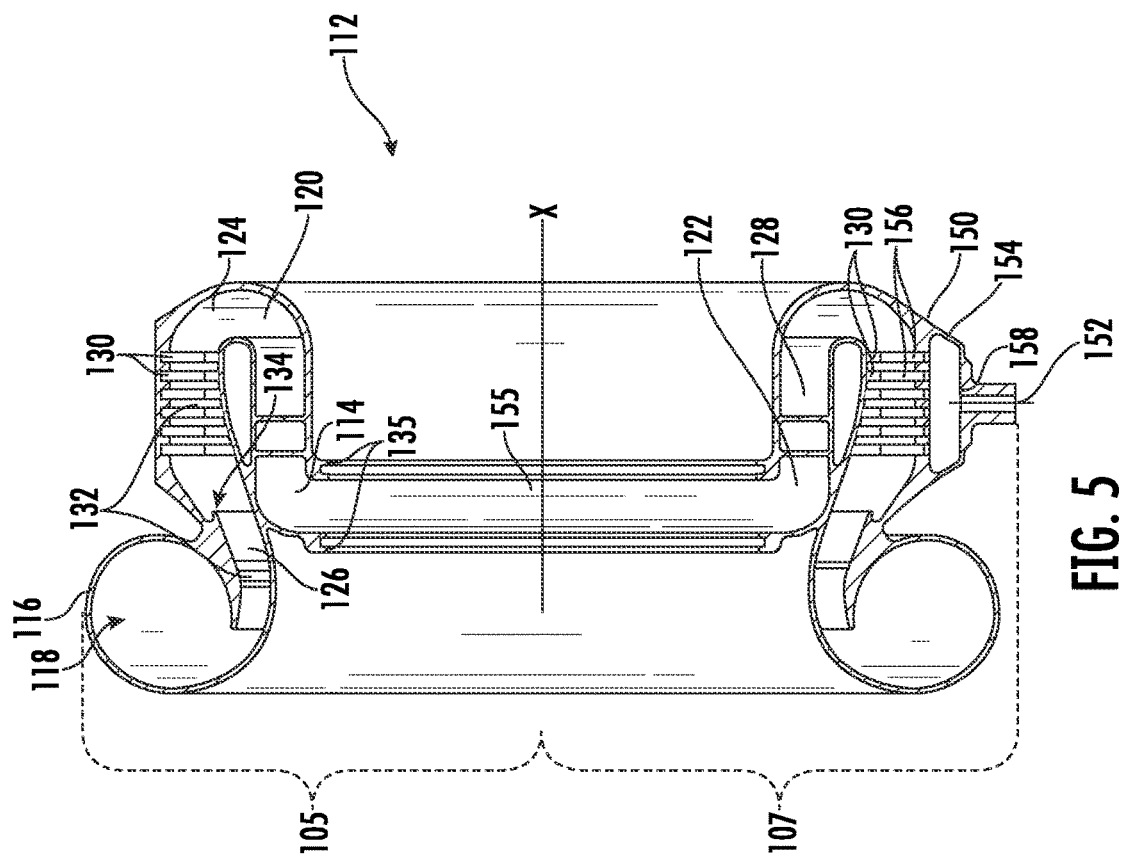
FIG. 5 is a cross-sectional view of the annular water collector shown in FIG. 4 according to a non-limiting embodiment.
Figure 4:
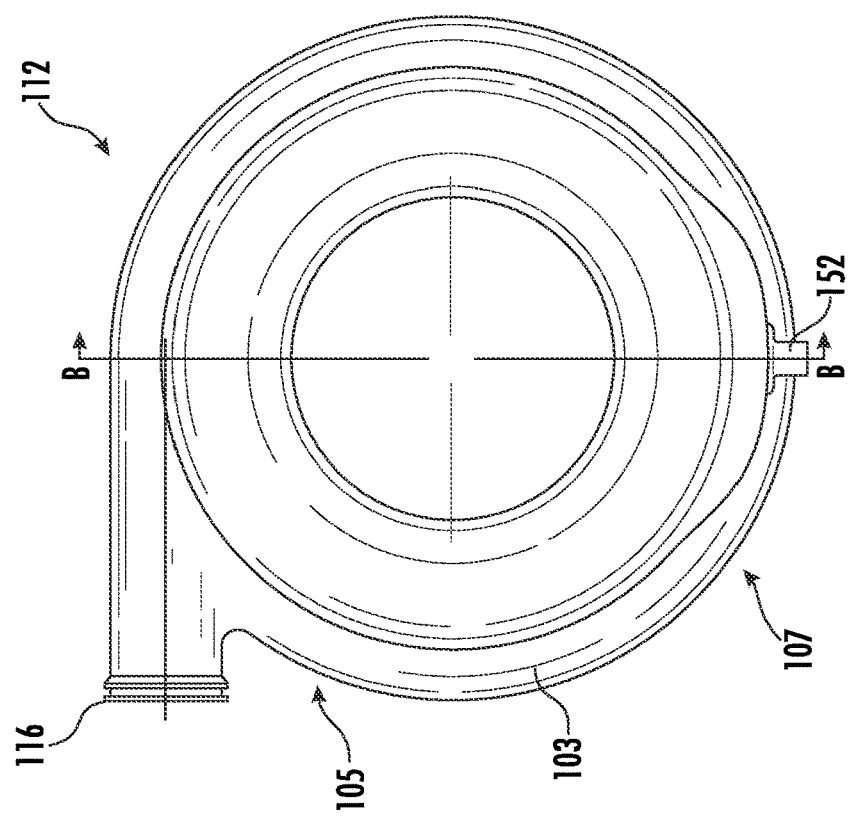
FIG. 4 is a side-view schematic of the annular water collector shown in FIG. 3 according to a non-limiting embodiment.

In one or more embodiments, the water collector 104 includes an inlet plenum 115 that extends around the entire circumference of the opening 110 and is in fluid communication with the collector air inlet 114 (see FIG. 5). Accordingly, the water collector 104 can be disposed in the opening 110 and fitted with the LRU 102 such that the air outlet 108 of the LRU 102 is in fluid communication with the inlet 115 (see FIG. 5) of the water collector 104. The air output from the LRU 102 can then be captured in the inlet plenum 115 and delivered to the coalescing unit 112 where moisture is coalesced as described in greater detail below.

Figure 6:
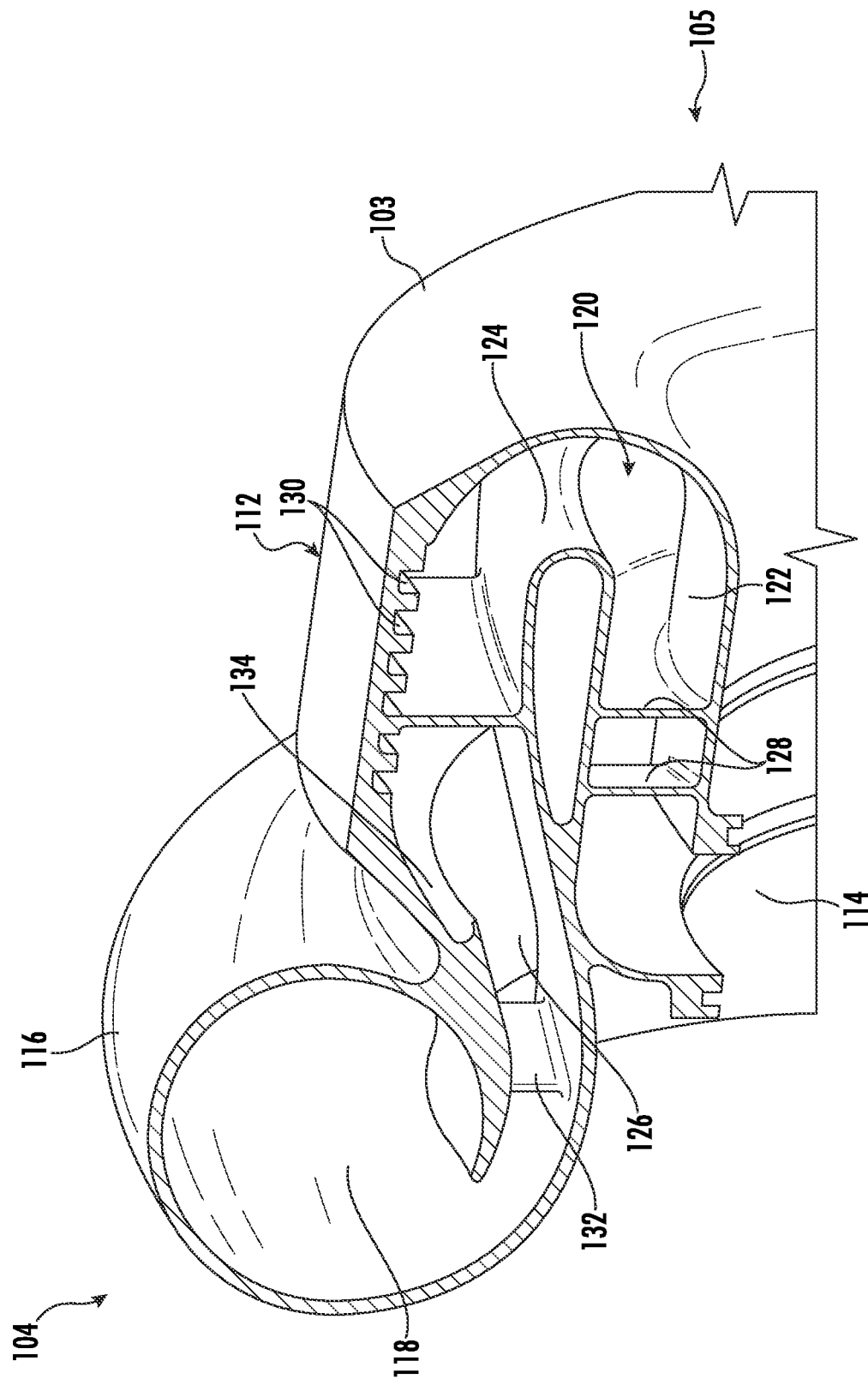
FIG. 6 is a cross-sectional view of an upper portion of the annular water collector shown in FIG. 5 according to a non-limiting embodiment.

Referring to FIGS. 5-7, the water collector 104 is illustrated in greater detail. The water collector 104 includes an upper portion 105 and a lower portion 107. The upper portion 105 includes a coalescing unit 112 having a collector inlet 114 and an outlet flange 116. The coalescing unit 112 configured to coalesce moisture from the air received from the air outlet 108 of the LRU 102. In one or more non-limiting embodiments, the water collector 104 can coalesce and remove the moisture with a collection efficiency 95% or more.

The outlet flange 116 defines a collector outlet 118 configured to expel the air (having a reduced amount of moisture) exiting the coalescing unit 112. In one or more non-limiting embodiments, the collector outlet 118 has a torus profile and expels the air exiting the coalescing unit 112 in a second direction (e.g., along the Y-axis) orthogonal to the first direction (e.g., the X-axis) and the center axis (X-X). Although the collector outlet 118 is described as having a torus profile, the collector outlet 118 is not limited thereto and can be additively manufactured to have various profiles capable of coupling to a second LRU (not shown in FIGS. 5-7). The second LRU can include, for example, a pre-heater unit configured to receive the air (having a reduced amount of moisture) output from the water collector 104.

Still referring FIGS. 5-7, the coalescing unit 112 includes a helical air passage 120. The helical air passage 120 is defined by an inlet channel 122 that extends from the collector inlet 114, around a tear-drop turn 124 (also referred to as a hairpin turn), and to an outlet channel 126 that is in fluid communication with the collector outlet 118. The tear-drop turn 124 can be designed as a one-hundred and eighty degree (180°) tear-drop turn, for example. However, it should be appreciated that the specific degree of the tear-drop turn 124 may vary in degrees without departing from the scope of the invention. The helical air passage 120 promotes the coalescing of the water droplets received from the upstream LRU 102 into rivulets. As the air flow travels through the tear-drop turn 124, the cross sectional area increases and air flow begins to diffuse. As the air flow diffuses, its flow velocity reduces, thereby improving the ability to separate the moisture from the air flow.

In one or more non-limiting embodiments, the inlet channel 122 includes an upper portion of one or more axial swirl vanes 128. The upper vane portion extends between an inner surface of the inlet channel 122 and the tear-drop turn 124. The axial swirl vanes 128 can be axially oriented either clockwise or counterclockwise and are configured to promote the collected moisture to flow in a common direction, thereby improving the ability to collect the moisture (e.g., water droplets) from the slowed air flow.

The outlet channel 126 includes one or more collector grooves 130 configured to collect moisture that adheres thereto after flowing from the inlet channel 122 into the outlet channel 126. Each collector groove 130 is integrally formed in the inner surface of the housing 103 and includes an upper groove portion that extends from the upper portion 105 to a lower groove portion located at the lower portion 107. As the diffused air flow passes across the collector groove 130, free moisture adheres to the sidewalls of the grooves (e.g., via capillary action) and is directed to the lower portion 107 (e.g., via gravity) where it can be collected as described in greater detail below.

The outlet channel 126 may further include one or more optional support vanes 132. The support vane 132 extends from a lower inner surface of the outlet channel 126 to an upper inner surface of the outlet channel 126. The support vane 132 is oriented parallel with respect to the air flowing through the outlet channel 126 so as to minimize the pressure drop within the water collector 104.

The lower portion 107 includes a collection unit 150 in fluid communication with the coalescing unit 112 and a drain port 152. The collection unit 150 is configured to collect the moisture coalesced by the coalescing unit 112. In one or more non-limiting embodiments, the collection unit 150 includes a lower portion of the axial swirl vanes 128 and a sump 154. The lower portion of the axial swirl vanes 128 extends to the upper portion of the axial swirl vanes via a vane body. The sump includes one or more drainage holes 156, which serve as fluid inlets. Each drainage hole 156 is in fluid communication with a respective collector groove 130 via a respective drainage hole 156. Accordingly, the moisture coalesced by the coalescing unit 112 and collected by the collector grooves 130 can be delivered into the sump 154.

The sump 154 further includes a sump outlet 158, which can eject (e.g. spray) the collected moisture (e.g., water) so as to remove the moisture from the water collector 104.

The water collector 104 can further including at least one gutter 134 in fluid communication with the inner surface of the housing 103. The gutter 134 is configured collect moisture condensed on the outer surface of the housing 103 and deliver the collected moisture to the collection unit 150. In one or more non-limiting embodiments, the gutter 134 extends circumferentially to lower section 107 into adjacent groove 130 and then into sump 154. Accordingly, moisture present on the outer surface of the housing can be delivered (e.g., primarily by gravity) to the sump 150.

With reference now to FIG. 8, operation of an AWRS 100 including a high-pressure water collector 104 and LRU 102 is illustrated according to a non-limiting embodiment. In one or more non-limiting embodiments, the LRU 102 (shown in phantom) can be configured as a heat exchanger unit including an annular heat exchanger. The LRU 102 receives cooled output air 800 from a turbine (not shown), which is passed through a cool flow path 802 of the annular heat exchanger. The secondary heat exchanger includes an air inlet 106, which receives compressed hot air flow 804. In one or more non-limiting embodiments, the hot air flow 804 can be compressed ambient air output generated by a bleed source (not shown) and an ACM compressor (not shown). The compressed hot air flow 804 is conveyed along a hot air flow path 806 from the air inlet 106 to the collector air inlet 114, where it is enters the water collector 104. As the compressed hot air flow 804 travels from the air inlet 106 to the collector air inlet 114, it flows counter to the cool output air 800 to perform a heat exchange process. The temperature difference between the hot air flow 804 and the cooled output air 800 causes moisture to condense from the hot air flow 804.

As the compressed hot air flow 804 passes through the collector air inlet 114, it enters the helical air passage of the coalescing unit 112. Accordingly, the compressed hot air flow 804 passes around the axial swirl vanes 128 while flowing through the inlet channel 122. The compressed hot air flow 804 then turns and flows around the tear-drop turn 124 to enter the outlet channel 126. Accordingly, the compressed hot air flow 804 begins to diffuse and reduce in flow velocity. As the compressed hot air flow 804 passes across the collector grooves 130, free moisture adheres thereto. The moisture is then directed to the lower portion of the water collector 104 (e.g., via gravity) where it can be collected as described herein.

As described herein, one or more non-limiting embodiments provide an air cycle ECS including a high-pressure water collector configured to interact or operate in conjunction with a condenser. In at least one non-limiting embodiment, the water collector has an annular profile and is configured to wrap around the condenser. The annular water collector includes a plurality of axial swirl vanes and a plurality of collector grooves. Airflow including moisture (e.g., water particles) flows around the axial swirl vanes such and passes across the collector grooves. The moisture is coalesced from the air flow and adheres to the collector grooves. The collector grooves convey water into a collector sump due to a pressure gradient and gravity, where the water is collected. In one or more embodiments, the collected water can be ejected (e.g., sprayed) from the collector sump and removed from the ACM.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of removing moisture from an air cycle environmental control system (ECS), the method comprising:
    directing air flow toward a housing of a water collector, the housing extending radially about a center axis to define an annular profile with an opening configured to receive a line replaceable unit (LRU), the housing having an inner surface that extends radially about the opening and has a diameter defined by the profile of the opening;
    delivering the air flow into an upper portion of the water collector, the upper portion including a coalescing unit having a collector inlet that defines an inlet air path extending along a first axis to receive the air flow, and conveying the air flow through a helical passage of the coalescing unit defined by an inlet channel extending from the collector inlet, around a tear-drop turn, and to an outlet channel that is in fluid communication with a collector outlet;
    coalescing moisture from the air flow as it flows through the coalescing unit;
    delivering the coalesced moisture to a collection unit included in a lower portion of the water collector and downstream from the coalescing unit and in fluid communication with the coalescing unit via the inner surface so as to collect the coalesced moisture;
    directing the air flow through the inlet air path to an outlet flange on a side of the upper portion, the outlet flange having a torus profile defining an outlet air path extending along a second axis that is orthogonal to both the first axis and the center axis;
    expelling the air exiting the coalescing unit along the outlet air path via the collector outlet.

2. The method of claim 1, wherein outputting air flow from the LRU to the collector inlet further comprises wrapping the water collector entirely around at least a portion of the LRU such that an air outlet of the LRU is in fluid communication with the collector inlet and outputting the airflow from the air outlet directly to the collector inlet.

3. The method of claim 2, wherein coalescing moisture from the air flow as it flows through the coalescing unit further comprises passing the airflow across at least one collector groove included in the coalescing unit and collecting the moisture on the at least one collector groove as the airflow passes thereacross.

4. The method of claim 3, wherein delivering the coalesced moisture to a collection unit comprises:
    conveying the moisture along the at least one collector groove to the collection unit; and
    collecting the moisture conveyed from the at least one collector groove in a sump located in the lower portion of the water collector.

* * * * *